United States Patent [19]

Zollinger

[11] 4,414,454

[45] Nov. 8, 1983

[54] METHOD OF WELDING CONTINUOUS RAILS AND APPARATUS THEREFOR

[75] Inventor: Hans R. Zollinger, Geroldswil, Switzerland

[73] Assignee: H. A. Schlatter AG, Schlieren, Switzerland

[21] Appl. No.: 292,597

[22] Filed: Aug. 13, 1981

[51] Int. Cl.³ .................. B23K 11/02; E01B 29/17
[52] U.S. Cl. ........................... 219/53; 104/15; 219/101; 219/103; 219/161
[58] Field of Search ............... 219/53, 55, 97, 101, 219/103, 161; 228/49 R, 49 A; 104/2, 15

[56] References Cited

U.S. PATENT DOCUMENTS

| | | | |
|---|---|---|---|
| 2,250,869 | 7/1941 | Jones et al. | 104/15 |
| 3,204,079 | 8/1965 | Cox | 219/101 |
| 3,349,216 | 10/1967 | Paton et al. | 219/101 |
| 4,103,139 | 7/1978 | Zollinger | 219/101 |

Primary Examiner—B. A. Reynolds
Assistant Examiner—Alfred S. Keve
Attorney, Agent, or Firm—Robert E. Knechtel

[57] ABSTRACT

A method and apparatus for forming a continuous railroad track including a mobile welding plant which is comprised of, for example, a string of flat cars for transporting a number of already formed continuous rails, another flat car or the like carrying means such as a winch and other related apparatus for delivering the individual continuous rails to the mobile welding plant, and another flat car or the like transporting a puller or pusher apparatus for controlling the movement of the continuous track which is formed, in and from the mobile welding plant.

12 Claims, 9 Drawing Figures

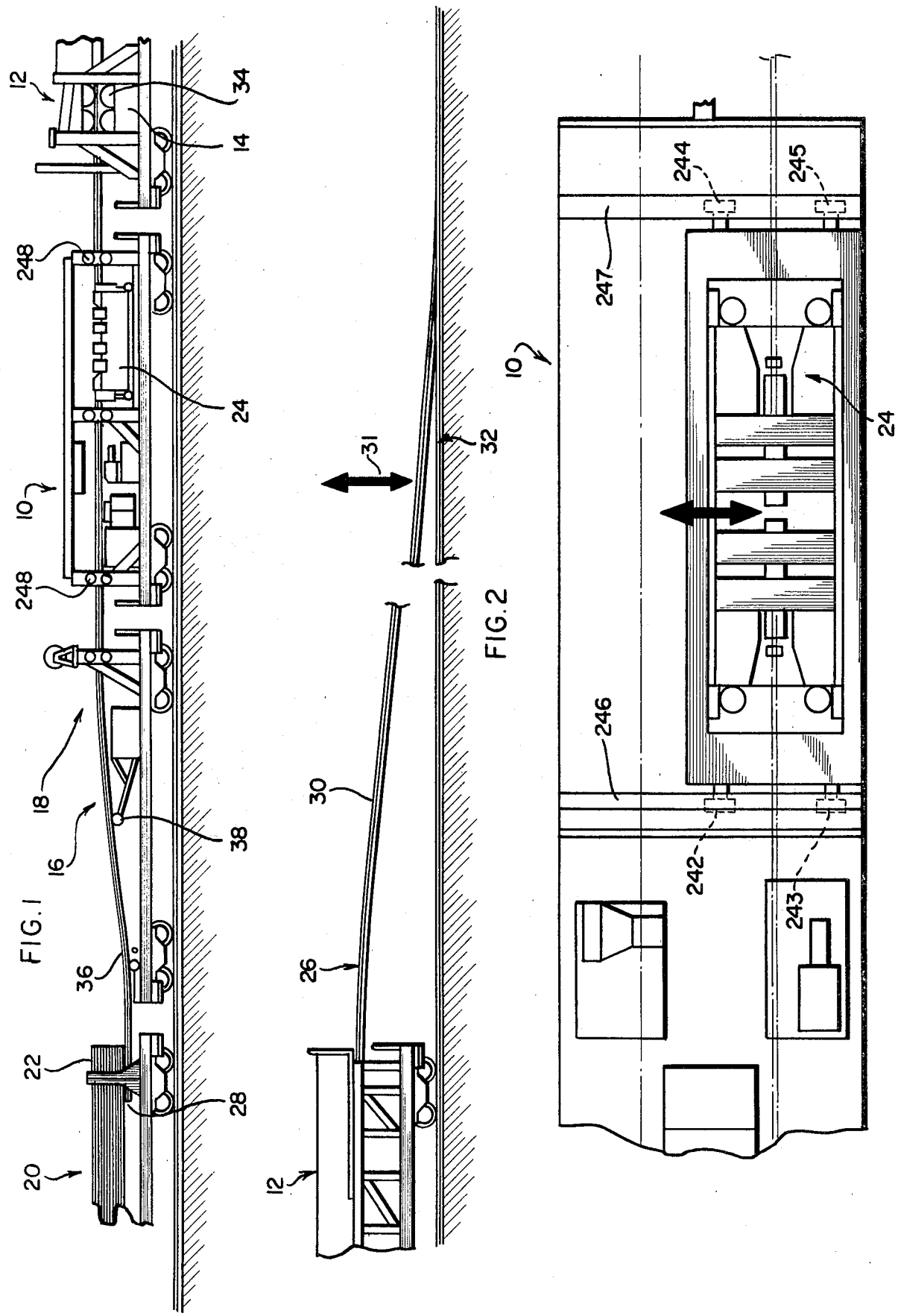

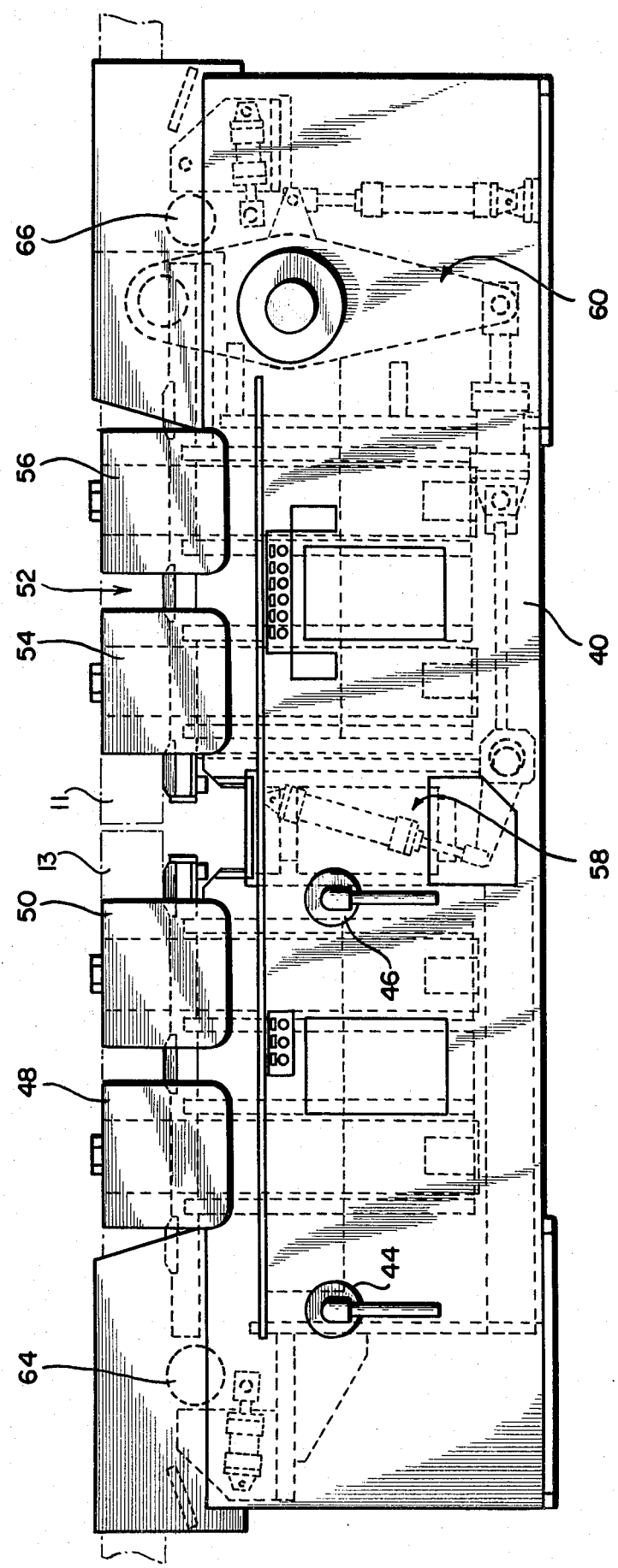

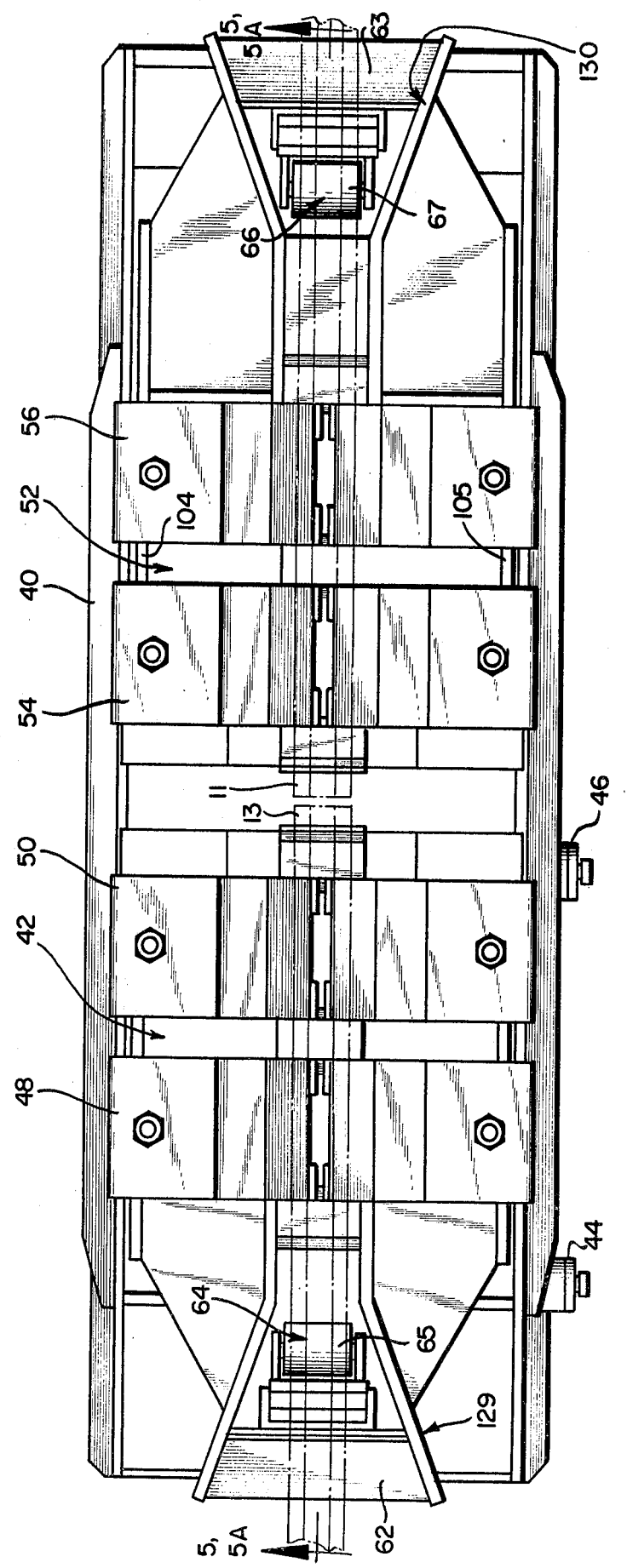

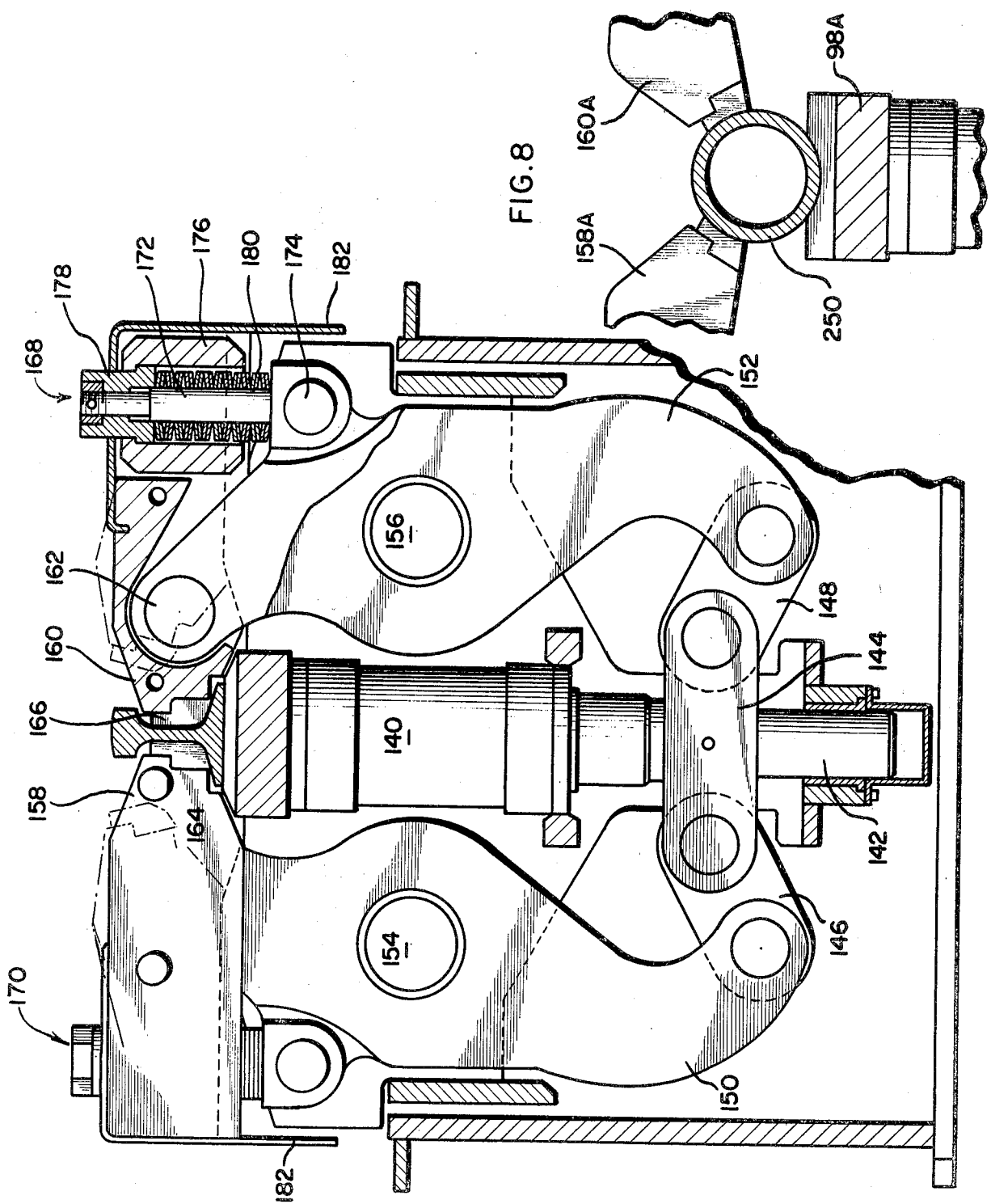

METHOD OF WELDING CONTINUOUS RAILS AND APPARATUS THEREFOR

BACKGROUND OF THE INVENTION

This invention relates generally to a new and improved method and apparatus for forming a continuous railroad track and is more particularly concerned with a new and improved method and apparatus comprising a number of individual components coacting to produce a continuous railroad track much more quickly, more economically and more efficiently than has heretofore been possible. While the disclosure hereinafter set forth is primarily directed to forming a continuous railroad track, it will be evident that the method and apparatus is likewise applicable for forming, for example, a continuous pipeline and other like continuous length articles.

For a number of years it has been evident that the use of railroad tracks in the form of rail sections welded together to form a continuous strip is particularly desirable because such a construction not only increases the riding comfort of railroad passengers and reduces the shock and vibration to which rail freight is subjected but, at the same time, is substantially trouble-free and, hence, requires considerably less maintenance of rolling stock and track, than tracks of the type employing individual rail sections bolted or otherwise secured together. At the present time, the method and apparatus for forming a continuous rail is generally well established, and is disclosed in U.S. Pat. Nos. 3,982,091; 4,103,139 and 4,270,036, as well as other U.S. and foreign patents. However, in the context of these patents, the continuous rail which is formed is on the order of up to one quarter mile in length. These continuous rails are loaded onto flat cars or the like lined up adjacent the welding apparatus, and ultimately transported to an area where they are laid to form a railroad track. The flat cars may have loaded thereon a sufficient number of these continuous rails to form a continuous track many miles in length.

The present invention is primarily concerned with the method and apparatus for welding together these continuous rails to form the continuous track. In addition, a new and improved welding apparatus which can be used to form both continuous rails and a continuous track is disclosed.

In the past, various methods have been utilized to form a continuous track, however, these methods generally are far from satisfactory, for one reason or another. For example, the continuous rails have been mechanically connected together, in much the same fashion as ordinary rail sections presently are mechanically connected together, and then subsequently welded by hand. This method is not generally acceptable in view of the difficulty in physically handling the long lengths of continuous rails and the difficulty in providing a good weld between the joined lengths of rail. Other methods utilize apparatus to flash weld the rails together, however, the equipment required to provide the weld is extremely complex and essentially utilizes brute strength to manipulate the rails. These methods also encounter considerable difficulty as a result of the material consumed during the welding operation, hence these methods likewise are not entirely acceptable.

Accordingly, it is an object of the present invention to provide a new and improved method and apparatus for forming a continuous rail.

More particularly still, it is an object to provide a new and improved method and apparatus for forming a continuous track, be welding together previously formed continuous rails.

A still further object is to provide a new and improved welding apparatus.

The foregoing and other objects are realized, in accordance with the present invention, by providing a mobile welding plant in combination with, for example, a string of flat cars for transporting a number of already formed continuous rails, another flat car or the like carrying means such as a winch and other related apparatus for delivering the individual continuous rails to the mobile welding plant, and another flat car or the like transporting a puller or pusher apparatus for controlling the movement of the continuous track which is formed, in and from the mobile welding plant. In order to explain the method of forming the continuous track, assume that one or more continuous rails already have been welded together to form the start of the continuous track. This length of continuous track is moved out of the mobile welding plant by the operation of the puller apparatus and laid on the ties of the railroad bed, with the end of this continuous track located in the welding apparatus at its center. One of the continuous rails is delivered by means of the winch into the mobile welding plant, with its end opposite the end of the continuous track at the center of the welding apparatus. The ends of the continuous rail and the continuous track then are clamped and vertically and horizontally aligned, all as more specifically described below, in preparation to forming the weld between the ends thereof. As is generally well known, a flash butt welding operation is carried out under advance, return and upsetting movements carried out with the secondary voltage applied. Normally, in forming the continuous rail, this is not a particularly difficult operation to perform since the short rail section being welded to the longer segment of the continuous rail already formed is the one which is manipulated or moved. However, in welding the continuous rail which may be a quarter mile in length to the continuous track which may be many miles in length, it is apparent that it is exceedingly difficult to move either of these two lengths of rail. Under such circumstances, it would appear obvious that it still is more practical to move the continuous rail rather than the continuous track, since it is much shorter in length even though it may be a quarter of a mile in length. As indicated above, in other methods, this has been done, but it requires the application of brute strength to do so. As a result, the apparatus performing this operation is complex and necessarily heavy in both structure and capability. Contrary to what has previously been attempted, and that which appears to be the obvious expedient, in accordance with the method of the present invention, the end of the longer continuous track is moved relative to the end of the shorter continuous rail to provide the necessary advance, retract and upsetting movements. The continuous track extends a considerable distance from its end at the center of the welding apparatus, and there is a relatively long loop of approximately 50–100 feet in length spanning the distance from the puller apparatus to where the continuous track engages the ties of the railroad bed upon which it is being laid. Normally, such a rail is considered to be rigid, but long lengths of rail such as the long loop of approximately 50–100 feet in length actually is quite flexible, at least sufficiently flexible to permit the end of the continuous track to be moved in the welding apparatus to provide the necessary advance, retract and upsetting movements to form the weld. Accordingly, advantage is taken of this discovered phenomenon, to easily form the weld.

DESCRIPTION OF THE DRAWINGS

The invention both as to its organization and manner of operation together with further objects and advantages will best be understood by reference to the following detailed description taken in conjunction with the accompanying drawings wherein:

FIG. 1 is a plan view generally illustrating the apparatus utilized in forming a continuous track and the manner in which advantage is taken of the long loop of continuous rail or track to achieve the flash butt welding operation;

FIG. 2 is a partial top plan view of the mobile welding plant generally illustrating the manner in which the welding apparatus is laterally positionable to alternatively weld two continuous tracks.

FIG. 3 is a side plan view of the welding apparatus exemplary of the invention;

FIG. 4 is a top plan view of the welding apparatus of FIG. 3;

FIG. 7 is an enlarged, partial sectional view illustrating the construction of the clamping devices; and FIG. 8 is a partial side plan view generally illustrating the manner in which the welding apparatus is adopted to weld a continuous pipeline.

DETAILED DESCRIPTION OF THE INVENTION

Figure 5:
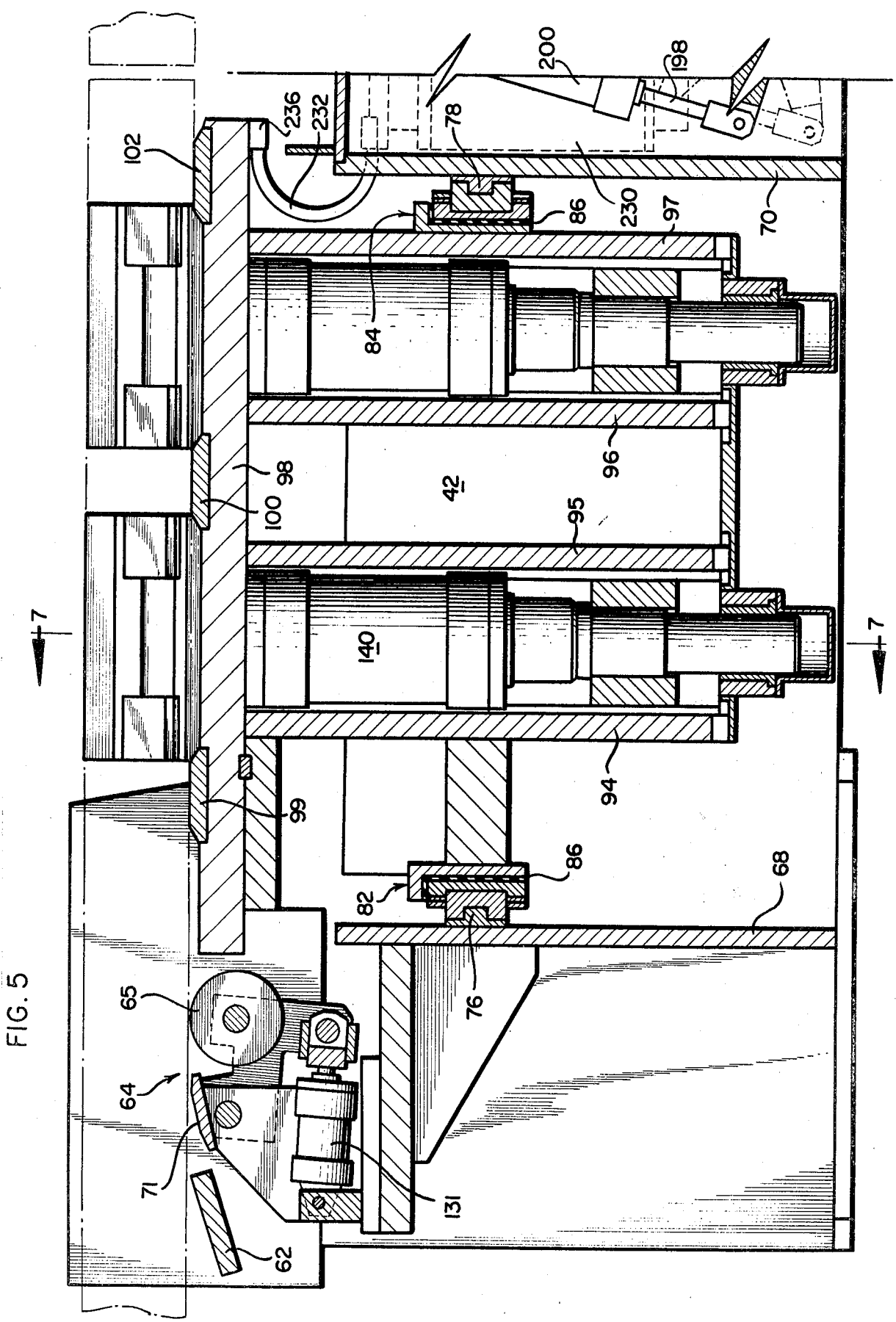
FIGS. 5 and 5A when placed together is an enlarged sectional view of the welding apparatus of FIGS. 3 and 4.

Referring now to the drawings, in FIGS. 1 and 2 there is generally illustrated the apparatus utilized to form a continuous track in accordance with the method of the invention, which apparatus includes a mobile welding plant 10 which is completely self-contained and includes a welding apparatus 24 for welding together the ends of the continuous rails 22 and the continuous track 26. The mobile welding plant 10 has coupled therewith a flat car 12 transporting a puller apparatus 14 and a flat car 16 transporting a winching apparatus 18.

The puller apparatus 14 may be of the type presently available and used in handling rails. Such puller apparatus 14 generally includes one or more pairs of opposed rollers, such as the rollers 34 which are hydraulically operated to both tightly clamp the continuous rail 26 between the rollers and to rotatably drive these rollers to move the continuous track, and the train of cars as the formed continuous track 26 is laid on the track bed 32. The winching apparatus 18 and its associated apparatus likewise may be of the type available and used in handling rails. Generally, the winching apparatus 18 includes a cable having means on its end for quick coupling to a rail. It may be manually or automatically operated to wind the cable to pull the continuous rail 22 from the flat cars 20 and to feed them to the mobile welding plant 10. The flat car 16 generally carries a pair of rollers 36 and 38 which are engaged by the continuous rails 22, for lifting and guiding the latter as the rails are fed to the mobile welding plant.

A series of flat cars 20, only one of which is shown, are coupled to the flat car 16 and transport a number of continuous rails 22. These continuous rails 22 may be a quarter of a mile or more in length and formed in the manner disclosed in the above identified U.S. Pat. No. 3,982,091. Generally, the continuous rails 22 are pulled from the flat cars 20 by the winching apparatus 18 and fed into the mobile welding plant 10, wherein the ends thereof are welded by means of the welding apparatus 24 to the end of the formed continuous track 26. After a weld is formed, the puller apparatus 14 is operated to pull the formed continuous track 26 through the welding apparatus 24, until the end of the continuous rail 22 just welded to it, such as the end 28, is located or positioned in the center of the welding apparatus 24. As the continuous track 26 is pulled through the welding apparatus, the entire train consisting of the mobile welding plant 10 and the flat cars 14, 16 and 20 are moved down the track and the continuous rail 26 is laid on the railroad track. Another continuous rail 22 then is pulled from the flat cars 20, and its end is fed into the welding apparatus 24, until it is centered therein opposite the end of the formed continuous track 26. The ends of these rails are clamped and vertically and horizontally aligned in preparation to welding together these ends, in the manner described in the aforesaid U.S. Pat. No. 3,982,091.

As indicated above, the formed continuous track 26 may be many miles in length, and there is a long loop 30 spanning above the track bed 32, from where the continuous track 26 leaves the welding apparatus 24 until it rests on the track bed 32. This long loop 30, it is found, is sufficiently flexible that the end of the continuous track 26 can be moved to provide the advance, retract and upsetting movements to perform the flash butt welding operation to weld together the ends of the continuous rails and the formed continuous track. More particularly, the continuous rail or track when it is advanced or retraced is flexible up and down on the railroad ties as generally indicated by the arrow 31, and this flexibility of the continuous rail or track provides a sufficient length of rail to achieve the flash butt weld operation. The advance, retract and upsetting movements are performed relatively easily; since the length of the continous rail or track is not being physically moved.

As indicated above, the welding apparatus 24 may be of the type disclosed in U.S. Pat. No. 3,982,091, in which event, if it is desired to form two continuous tracks at the same time, a second mobile welding plant 10 is added to the train of cars to form the other one thereof. The continuous rails 22 are alternately fed to the respective ones of the two mobile welding plants 10 as the continuous tracks 26 are formed. Preferably and advantageously, however, a welding apparatus 24 constructed in accordance with the present invention is utilized. The mobile welding plant 10, in such case, is of a construction such that the welding apparatus 24 can be laterally positioned to first weld one and then the other continuous tracks 26 forming the railroad track, as generally illustrated in FIG. 2 and as more fully described below.

More particularly, the mobile welding plant 10 is completely self-contained and may include welding apparatus 24 of the type disclosed in U.S. Pat. No. 3,982,091. Preferably, however, a welding apparatus 24, in accordance with the present invention, constructed as disclosed in FIGS. 3-7 is utilized.

The improved welding apparatus 24, as can be seen in FIGS. 3-7, includes a fixed assembly 42 and a movable assembly 52, both of which are supported within a main frame 40. The movable assembly 52 is movable in the sense that it is movable longitudinally with respect to the main frame 40 whereas the fixed assembly 42 is not, although the latter may be moved transversely with respect to the main frame 40. As illustrated in FIG. 4, the fixed assembly 42 is located on the left side of the welding apparatus 24, and the movable assembly 52 is on the right.

Figure 5A:
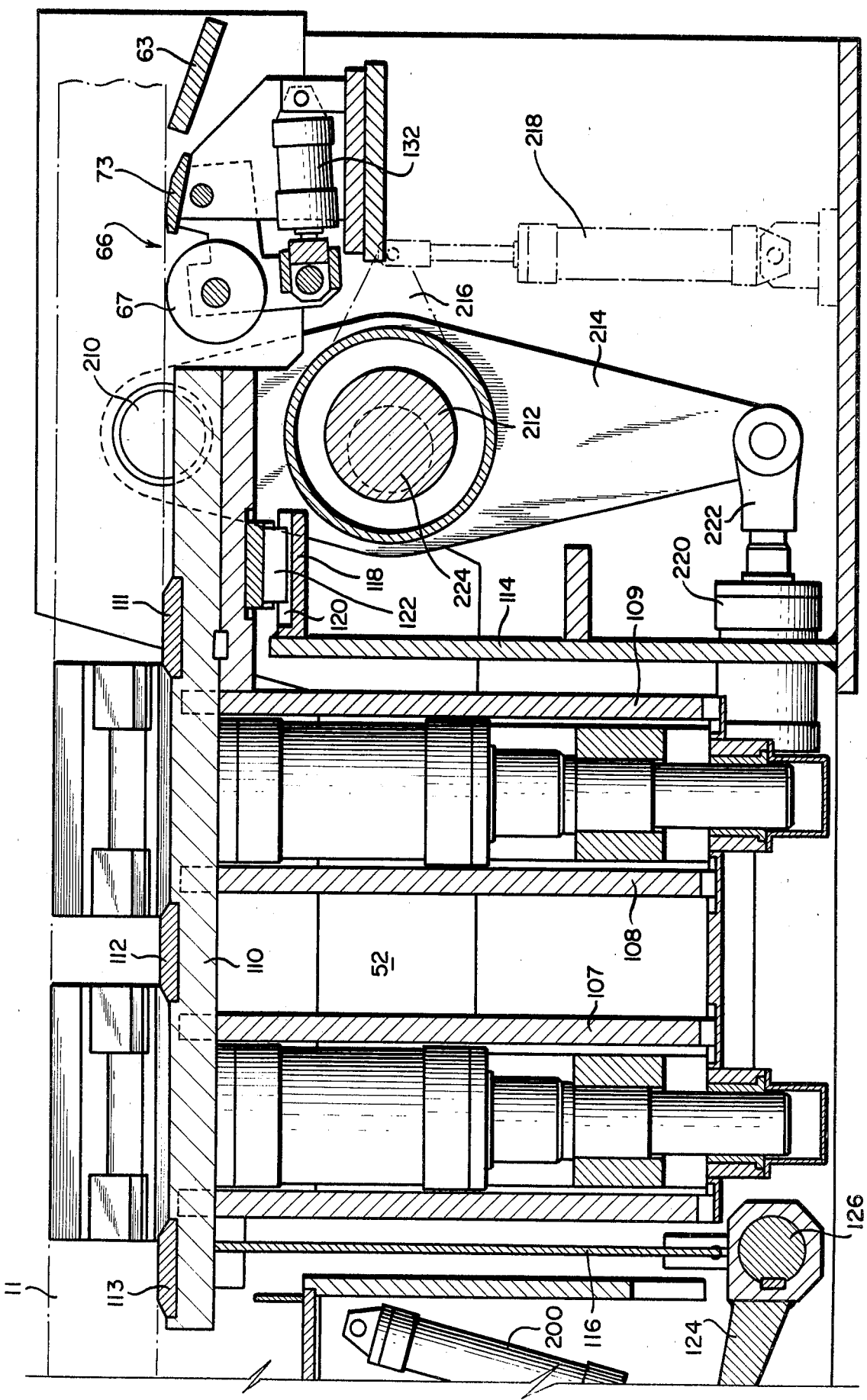
Figure 6:
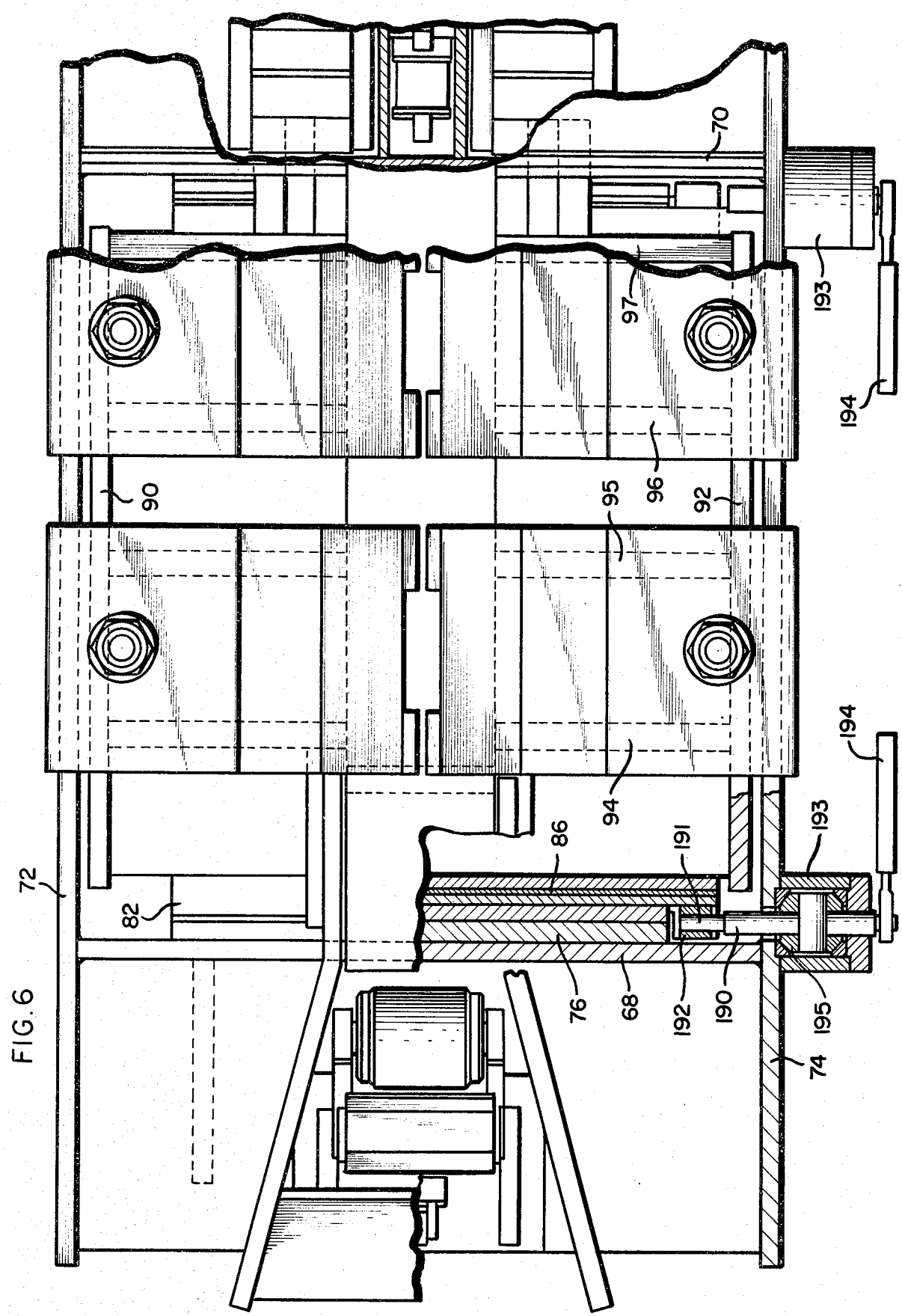
FIG. 6 is a partial, enlarged top sectional view of the fixed assembly of the welding apparatus generally illustrating the apparatus for laterally adjusting it.

The fixed assembly 42, as can be best seen in FIGS. 5, 5A and 6, generally includes a pair of spaced-apart side walls 90 and 92, between which are fixedly secured in spaced-apart relationship four vertical walls 94-97 to form a box-like frame spaced from and disposed within the main frame 40. This box-like frame is supported within the main frame 40, and is laterally adjustable with respect to the latter, by means of slide block assemblies 82 and 84 affixed to the vertical walls 94 and 97, respectively, and T-shaped horizontal guide bars 76 and 78 which are fixedly secured respectively to the vertical walls 68 and 70. These vertical walls 68 and 70 span between and are fixedly secured to the side walls 72 and 74 of the main frame 40, as can be best seen in FIG. 6. The slide block assemblies 82 and 84 include insulation, such as insulation 86, for electrically insulating the fixed assembly 42 from the main frame 40.

A heavy steel frame member 98 located centrally between the side walls 90 and 92 is fixedly secured to and extends across the upper edges of the vertical walls 94-97. This frame member 98 carries on the top surface thereof steel pads 99, 100 and a hard copper electrode 102 which are disposed in spaced-apart relationship along the length thereof.

The fixed assembly 42 includes two clamping devices 48 and 50 for clamping the rail, and two horizontal adjusting devices 44 and 46 for laterally positioning the fixed assembly 42 to align the end of the rail clamped therein with the rail end to which it is to be welded.

The movable assembly 52 also includes a box-like frame formed of a pair of spaced-apart side walls 104 and 105 (FIG. 4), between which are fixedly secured in spaced-apart relationship four vertical walls 106-109. A heavy steel frame member 110 is located centrally between the side walls 104 and 105, and is fixedly secured to and extends across the upper edges of the vertical walls 106-109. This frame member 110 has steel pads 111, 112 and a hard copper electrode 113 affixed to its upper surface in spaced-apart relationship along its length. The box-like frame of the movable assembly 52 is transversely movably supported within the main frame 40, at its right end, as illustrated in FIG. 5A, by a shaft 210 which forms part of the advance and upsetting device 60 more particularly decribed below and, at its left end, by vertical wall 116 which forms part of a vertical adjusting device 58 and which is freely movable with respect to the main frame 40. A vertical wall 114 has a horizontally disposed steel shelf 118 fixedly secured to it and to the side walls 72 and 74 of the main frame 40, which shelf 118 has a guide slot 120 formed in it for slidably receiving therein a guide block 122 supported beneath and affixed to the frame member 110. As more particularly described below, the box-like frame of the movable assembly 52 is transversely movable with respect to the main frame 40, and as it is transversely moved, the guide block 122 slides back and forth in the guide slot 120 in the shelf 118, thus the guide block 122 retains the alignment of the box-like frame with respect to the main frame 40. As indicated above, the transverse movement of the box-like frame of the movable assembly 52 is accomplished by an advance and upsetting device 60.

The vertical wall 116 supporting the left end, as illustrated, of the box-like frame of the movable assembly 52 is affixed and supported at its lower end by a lever arm 124 secured to an eccentric shaft 126. The upper end of the vertical wall 116 is secured to the underside of the frame member 110. As more particularly described below, upon actuation of the lever arm 124, the vertical wall 116 is raised or lowered to vertically adjust the position of the rail to align it with the rail end to which it is to be welded. Furthermore, the vertical wall 116 is deformable in the sense that it can be flexed as the movable assembly 52 is moved transversely with respect to the main frame 40 during the welding operation. The movable assembly 52 likewise includes two clamping assemblies 54 and 56 fully described below.

The main frame 40 also includes at each of its opposite ends a rail feed-in funnel 129 and 130 for guiding the rails into the welding apparatus. A shelf 62, 63 is disposed at the entrance to the rail feed-in funnels 129 and 130 to deflect the ends of the rails upwardly and to protect roller assemblies 64 and 66 disposed therein. The roller assemblies 64 and 66 include rollers 65 and 67 upon which the rails are supported, and a steel pad 71, 73 is associated with the respective rollers 65 and 67 to protect them from damage as the rail ends are fed into the welding apparatus. The roller assemblies 64 and 66 further are rotatably pivotally supported and have hydraulic cylinders 131, 132 associated with them which are operable to raise and lower the rollers 65 and 67 and, hence, the rails supported by them, to raise the rails as they are fed into the welding apparatus.

CLAMPING DEVICES

As indicated above, the fixed assembly 42 and the movable assembly 52 each includes two clamping devices 48, 50 and 54, 56, respectively. These clamping devices are of a like construction, and can be best seen in FIG. 7 wherein one clamping device 48 is illustrated.

The clamping device 48 includes a hydraulic cylinder 140 which is vertically disposed and secured to the heavy steel frame member 98. As can be seen in FIG. 5, the hydraulic cylinder 140 is disposed between and protected by the vertical walls 94 and 95 of the box-like frame of the fixed assembly 42. Affixed to the piston 142 of the hydraulic cylinder 140 is a horizontally disposed lever arm 144 having pivotally affixed to each of its opposite ends a pivotal lever arm 146 and 148. Pivotally affixed to the opposite ends of these lever arms 146 and 148 is one end of a larger lever arm 150, 152 which are pivotally supported by a shaft 154, 156, respectively. Each of these larger lever arms 150, 152 has a lever arm 158, 160 pivotally affixed to it at its upper end by means of a pivot shaft, such as the pivot shaft 162. The ends of these lever arms 158, 160 carry a clamp member 164, 166, respectively, which when clamping rails are formed to clamp the web and base of a rail.

With this construction, when the hydraulic cylinder 140 is actuated to extend its piston 142, the knee lever system including the lever arms 144, 146, 148, 150 and 152 are pivotally operated and the upper ends of the lever arms 150 and 152 pivotally close, such that the lever arms 158, 160 and the clamp members 164, 166 on the ends thereof engage and clamp the web of the rail between them. A horizontal clamping force of approximately 500 kN is exerted on the web.

A vertical press-on force also is transmitted to the base of the rail by the lever arms 158, 160 through the action of the spring assemblies 168 and 170. These spring assemblies 168 and 170 include a shaft 172 which is pivotally affixed at one end thereof to the respective lever arms 150, 152 by a pivot shaft 174. The shaft 172 extends through a bushing 176 which forms a part of the lever arm 160 and which retains a spindle 178 through which the shaft 174 also extends and is threadedly engaged. A spring 180 is retained about the shaft 172 within the bushing 176 and is engaged with the underside of the spindle 178. The spring 180 transmits the press-on force to the lever arm 160, and the press-on force is adjustable by the settling of the spindle 178. The press-on force is approximately 200 kN, depending on the setting of the spindle 178. A shield 182 is disposed about the spring assemblies 168 and 170.

HORIZONTAL ADJUSTING DEVICE

The box-like frame of the fixed assembly 42 is supported for horizontal or lateral adjustment with respect to the main frame 40 by the horizontal guide bars 76, 78, and the slide block assemblies 82, 84. As can be best seen in FIG. 6, a shaft 190 has its one threaded end coupled through a threaded sleeve 192 to the slide block assembly 82, and is retained within a universal joint 195 secured within an assembly 193 secured to the wall 74. A ratchet 194 is coupled with the shaft 190 and its threaded end 191 for threadedly adjusting it, to horizontally displace the box-like frame of the fixed assembly 42, to align the ends of the rails. Slight angle corrections can be made, by means of a slight bow provided to the horizontal guide bars 76 and 78. A similarly constructed horizontal adjusting device 46 is associated with the slide block assembly 84.

VERTICAL ALIGNING

Vertical alignment of the rail ends is provided by the movable assembly 52. As indicated above, the end of the box-like frame of the movable assembly 52 near the weld axis is supported by the vertical wall 116 which is affixed at its lower end to the lever arm 124. The lever arm 124 is pivotally secured to the eccentric shaft 126, and its end is coupled to the piston 198 of a hydraulic cylinder 200. Upon actuation of the hydraulic cylinder 200 the lever arm 124 is pivotally rotated on the eccentric shaft 126 to raise and lower the vertical wall 116 and hence the box-like frame of the movable assembly 52 to vertically align the end of the rail clamped therein with the end of the rail clamped in the fixed assembly 42.

The movable assembly 52 also is supported by the above-mentioned shaft 210 which is, in turn, supported by a pair of spaced-apart lever arms 214. These lever arms 214 are, in turn, rotatably supported by an eccentric shaft 212. A lever arm 216 is coupled with the eccentric shaft 212, and is operated by a hydraulic cylinder 218. Operation of the hydraulic cylinder 218 pivotally rotates the lever arm 216 and hence the eccentric shaft 212 to thereby raise or lower the lever arms 214 and the shaft 210 which supports the movable assembly 52. The crown of the rail clamped within the movable assembly 52 therefore can be adjusted by operating the hydraulic cylinder 218 to raise or lower the movable assembly 52.

UPSETTING APPARATUS

As is well-known in the art, the flash butt welding operation is performed with an advance, return and upsetting movement, with the secondary voltage applied. These movements are carried out by means of a pair of spaced-apart hydraulic cylinders 220 which are pivotally affixed at their one end to the main frame 40, and have their pistons 222 coupled to the respective ones of the lever arms 214. Operation of the hydraulic cylinders 220 pivotally rotates the lever arms 214 about the shaft 224 to, in turn, cause the shaft 210 and hence the movable assembly 52 to move forward and backward with respect to the main frame 40. This movement of the movable assembly 52 provides the movement necessary to perform the flash butt weld.

WELD CURRENT FEED

Cables (not shown) for the primary current are routed through channels (not shown) to a welding transformer 230. The path of the welding current (the secondary side) goes from the transformer 230 via the current strap 232 and current bridge 236 to the electrode 102 the electrode 113 is correspondingly coupled to the transformer 230 via a current strap and a current bridge (neither of which are shown). From the electrodes 102 and 113, the current enters the bases of the rails. Additional transformers or transformer-rectifier groups can be provided, depending on the current demand.

DETAIL DESCRIPTION OF THE OPERATION

Now that the construction of the welding apparatus 24 has been described, the operation for forming a continuous track can be described. In the first instance, assume that a continuous rail 11 already has been fed from the flat cars 20 through the welding apparatus 24 and the pulling apparatus 14. The one end of this continuous rail 11 is disposed within the welding apparatus 24 at its welding axis. Otherwise, the continuous rail 11 since it may be a quarter mile or more in length extends out of the pulling apparatus 14 and lies on the ties to which it ultimately will be secured. In order to position the end of the continuous rail 11 exactly in the welding axis, the welding apparatus 23 can be moved transversely within the welding car 10 (the corresponding rollers and rails are shown in FIG. 1 and FIG. 2 and could be correspondingly positioned).

A second continuous rail 13 is pulled by the winding apparatus 18 from the flat cars 20, and fed into the welding apparatus 24 so that its end likewise is positioned at the welding axis. The end of this continuous rail 13 is fed into the rail funnel 129, and the continuous rail rides on the roller 65 which has been raised to prevent the rail from sliding across the steel pads 99, 100, and the electrode 102. When the end of the continuous rail 13 is positioned at the center or welding axis of the welding apparatus 24, the hydraulic cylinder 131 is operated to lower the roller 65 to permit the continuous rail 13 to seat on the steel pads 99, 100 and the electrode 102.

The clamping hydraulic cylinders 140 of the clamping devices 48 and 50 now are hydraulically operated, and through the knee lever system including the lever arms 144, 146, 148, 150 and 152, the clamp members 164 and 166 engage and clamp the web of the continuous rail 13 between them. A vertical press-on force also is transmitted to the base of the continuous rail 13 by the lever arms 158, 160 through the action of the spring assemblies 168 and 170. The continuous rail 13 now is firmly clamped in the fixed assembly 42 of the welding apparatus 24. Correspondingly, the continuous rail 11 is firmly clamped in the movable assembly 52 of the welding apparatus.

The ends of the two continuous rails 11 and 13 now may be horizontally aligned, by means of the horizontal adjusting devices 44 and 46 which are functional to horizontally adjust the position of the fixed assembly 42 with respect to the main frame 40 of the welding apparatus 24. More particularly, as fully described above, the ratchet or ratchets 194 are operated to threadedly adjust the position of the threaded shaft 191 and hence the fixed assembly 42 to which it is affixed. As indicated above, slight angle corrections can be made, by means of the slight bow provided to the horizontal guide bars 76 and 78.

The ends of the continuous rails 11 and 13 now are vertically aligned, by operating the hydraulic cylinder 200. As described above, operation of the hydraulic cylinder 200 pivotally operates the lever arm 124 and eccenctric shaft 126 to which it is affixed to, in turn, raise or lower the vertical wall 116 which supports the one end of the movable assembly 52. The other end of the movable assembly 52 and hence the continuous rail 13 also can be raised or lowered to vertically align the rails by operation of the hydraulic cylinder 218. As described above, operation of the hydraulic cylinder 218 pivotally operates the lever arms 214 and the shaft 210 which supports this end of the movable assembly 52. Since the continuous rail 11 is clamped within and is moved with the movable assembly 52, its end is raised or lowered into vertical alignment with the end of the continuous rail 13 clamped within the fixed assembly 42. The ends of the continuous rails are aligned such that the crowns thereof, i.e., the riding surfaces of the rails are vertically aligned after being welded.

With the ends of the continuous rails 11 and 13 now vertically and horizontally aligned, they can be flash butt welded together. This is achieved by supplying electrical current to the transformer(s) 230 which, in turn, provides secondary current to the electrodes 102 and 113 and hence the ends of the continuous rails 11 and 13. As is generally well-known in the art, the flash butt weld is accomplished through an advance, retract and upsetting movement of the ends of the rails with respect to one another. As indicated above, in accordance with the present invention, this is achieved by taking advantage of the long loop of approximately 50-100 feet in length of the continuous track extending from the welding apparatus 24 onto the railroad ties. Within this long loop of rail, there is sufficient rail length and flexibility that the end of the continuous rail 11 which now actually forms part of the continuous track already formed can be advanced, retracted and upset to achieve the flash butt welding. Accordingly, opposed to moving the shorter continuous rail 13, the end of the continuous rail 11 is moved, and this is accomplished by operation of the hydraulic cylinders 220. The hydraulic cylinders 220, as described above, pivotally operate the lever arms 214 to, in turn, advance and retract the shaft 210 supporting the movable assembly 52 and, hence, the continuous rail 11 clamped therein. The movements are controlled in accordance with well-known parameters, to achieve the flash butt weld. Also as indicated above, the vertical wall 116 is deformable or flexible, thus it flexes as the movable assembly 52 is advanced and retracted with respect to the main frame 40 during the flash butt welding operation.

When the ends of the rails are joined, the clamping devices 48, 50, 54 and 56 are released. The welded rail is lifted with the rollers 65 and 67 through the operation of the hydraulic cylinders 131 and 132 to prevent damage to the electrodes 102 and 113 as the welded rail is removed from the welding apparatus 24. The welding rail is removed by operation of the pulling apparatus 14 in the generally well-known manner, with the movement of the train being controlled and/or synchronized, to lay the welded rail which now is part of the continuous track on the railroad ties.

WELDING OF SECOND CONTINUOUS TRACK

As indicated above, a second continuous track can be simultaneously formed in a like manner by providing a second mobile welding plant. This second track then is extended through the second mobile welding plant. In an arrangement such as this, the welding apparatus 24 may be of the type disclosed in U.S. Pat. No. 3,982,091.

Preferably and advantageously, however, welding apparatus 24 in accordance with the present invention is utilized and, in such case, the welding apparatus 24 can be used alternately to weld one and then the other continuous track.

More particularly, as can be best seen in FIG. 7, the clamping arms 158 and 160 of the clamping devices 48, 50, 54 and 56 are pivotally operable to an open position, such that the welded rail and/or welding apparatus 24 can be freely raised or lowered with respect to one another without interference. The welding apparatus 24, in this case, is supported by four rollers 242-245 which are slidably retained within guide tracks 246 and 247. In addition, the welding apparatus 24 can be vertically raised and lowed by hydraulic cylinders (not shown), such that it can be lowered free of the welded rail and then laterally positioned and raised in operative position with the other one of the continuous tracks and/or rails, as generally illustrated in FIG. 3. The welded rails, in the meantime, are supported by rollers 248 carried by the mobile welding plant 10. Accordingly, with this arrangement, first one and then the other continuous tracks can be formed, simply by laterally shifting the position of the welding apparatus 24.

ADAPTABILITY

As indicated above, while the welding apparatus 24 described is particularly applicable for forming continuous railroad tracks, it is likewise adaptable to form other continuous length articles such as pipelines. In such cases, it is only necessary to provide differently shaped clamps and frame members which generally conform to the shape of the article to be welded. In FIG. 8, the welding apparatus 24 is adapted to weld a pipeline 250 and it can be seen that the electrode frame member 98A and the ends of the clamping devices 158A and 160A have been formed to conform to the periphery of the pipeline, so that the latter can be both clamped and welded in the manner described above. Other similar articles likewise can be welded.

ELECTRICAL AND HYDRAULIC SYSTEMS

The electrical and hydraulic systems utilized with the welding apparatus and arrangement disclosed are generally conventional in nature, and may be generally as disclosed in the above-mentioned U.S. Pat. No.

3,982,091. Accordingly, these electrical and hydraulic systems form no part of the present invention, for existing systems can be simply modified by those skilled in the art in a conventional fashion to provide the described operations.

It will thus be seen that the objects set forth above, among those made apparent from the preceding description, are efficiently attained and certain changes may be made in carrying out the above method and in the construction set forth. Accordingly, it is intended that all matter contained in the above description, or shown in the accompanying drawings, shall be interpreted as illustrative, and not in a limiting sense.

Now that the invention has been described, what is claimed as new and desired to be secured by Letters Patent is:

1. Welding apparatus for welding rail sections together in end-to-end relationship to form a continuous rail comprising a main frame, a fixed assembly supported by said main frame, a movable assembly supported by said main frame and longitudinally movable with respect to said fixed assembly, first and second electrodes respectively engageable with adjacent end portions of successive rail sections to be welded together and means for causing current flow between the electrodes and through the ends of the rail sections in order to make the weld, said fixed and movable assemblies each comprising a pair of clamp assemblies for clamping the ends of said rail sections to be welded together, said clamp assemblies each comprising a hydraulic cylinder, a pair of clamp arms pivotally supported in opposed relationship so as to clamp the web portion of a rail section between them and a plurality of lever arms coupled to said hydraulic cylinder and the respective ones of said pair of clamp arms for pivotally operating said clamp arms to clamp the web portion of said rail section between them upon operation of said hydraulic cylinder, a spring assembly associated with each of said clamp arms for transmitting to said clamp arms a vertical press-on force for clamping the base portion of a rail section, said clamp assemblies being pivotally operable to clamp a rail section between them and to open to permit the rail section and the welding apparatus to be vertically displaced with respect to one another.

2. The welding apparatus of claim 1, wherein each of said pair of clamp arms has removably affixed to the end thereof a clamp head formed to substantially correspond to the shape of said web and base portion of a rail section.

3. The welding apparatus of claim 1, wherein said main frame comprises a pair of spaced-apart vertical walls each having a horizontal guide bar fixedly secured to it, a pair of slide block assemblies affixed to said fixed assembly and slidably coupled respectively with one of said horizontal guide bars for supporting said fixed assembly for lateral adjustable movement with respect to said main frame, whereby the end of a rail section clamped within said fixed assembly may be horizontally aligned with the end of a rail clamped within said movable assembly, and means coupled to the respective ones of said slide block assemblies for laterally displacing said slide block assemblies and hence said fixed assembly.

4. The welding apparatus of claim 3, wherein said means coupled to the respective ones of said slide block assemblies for laterally displacing them comprises an assembly affixed to said main frame and having a threaded sleeve fixed against movement and a threaded shaft disposed within said threaded sleeve and coupled by a universal joint to said slide block assembly, and a ratchet assembly affixed to said threaded shaft for rotatably displacing said threaded shaft and hence said slide block assembly and said fixed assembly to which it is affixed.

5. The welding apparatus of claim 1, wherein said movable assembly is supported at its end adjacent the weld axis of said welding apparatus by means of a vertically disposed deformable wall and at its opposite end by a shaft supported by a pair of spaced-apart lever arms coupled with a housing supported by an eccentric shaft supported by said main frame, means coupled to said deformable wall for raising and lowering it with respect to said fixed assembly to vertically align the end of a rail section clamped to said movable assembly with the end of a rail section clamped to said fixed assembly, means coupled to said eccentric shaft for rotating it to raise and lower said housing and said lever arms supported by it to raise and lower said opposite end of said movable assembly, and means coupled to said lever arms for pivotally operating them to longitudinally advance and retract said movable assembly with respect to said fixed assembly.

6. The welding apparatus of claim 5, comprising an eccentric shaft supported by said main frame, a lever arm coupled to said eccentric shaft and supporting said deformable wall, and a hydraulic cylinder coupled to said lever arm for pivotally operating it about said eccentric shaft to raise and lower said deformable wall.

7. The welding apparatus of claim 5, wherein said means coupled to said eccentric shaft for rotating it comprises a lever arm pivotally coupled with said eccentric shaft, and a hydraulic cylinder coupled to said lever arm for pivotally operating it to rotate said eccentric shaft to raise and lower said other end of said movable assembly.

8. The welding apparatus of claim 5, wherein said means coupled to said lever arms for pivotally operating them comprises a pair of hydraulic cylinders pivotally affixed to said main frame and coupled respectively to one of said lever arms for pivotally rotating said lever arms about said housing supported by said eccentric shaft.

9. The welding apparatus of claim 1, comprising an eccentric shaft supported by said main frame, a lever arm pivotally coupled to said eccentric shaft, a vertically disposed deformable wall coupled to its one end to said lever arm, the opposite end of said deformable wall supporting the end of said movable assembly adjacent the weld axis of said welding apparatus, a hydraulic cylinder supported by said main frame and coupled to said lever arm for pivotally operating it to raise and lower said deformable wall to thereby raise and lower said end of said movable assembly, a second eccentric shaft supported by said main frame, a pair of spaced-apart lever arm pivotally supported by said second eccentric shaft, a shaft supported by said pair of lever arms and affixed to said movable assembly for supporting the other end of said movable assembly, a lever arm coupled to said second eccentric shaft for rotating it, and a hydraulic cylinder coupled to said main frame and said lever arm for pivotally operating said lever arm to rotate said second eccentric shaft to raise and lower said pair of lever arms and hence the end of said movable assembly.

10. The welding apparatus of claim 9, further comprising a pair of hydraulic cylinders respectively coupled to said main frame and to one of said lever arms for pivotally rotating said lever arms about said second eccentric shaft, the pivotal rotation of said lever arms causing said movable assembly to advance and retract longitudinally with respect to said fixed assembly and said main frame.

11. In an apparatus for welding continuous rail sections of a quarter mile or more in length together in end-to-end relationship to form a continuous track, the combination of a single railroad car containing electric welding apparatus, rail supply means for storing a plurality of said continuous rail sections, a rail transfer device for supplying said continuous rail sections from said rail supply means to said welding apparatus, a pusher mechanism for pushing the welded-together continuous rail sections forming the continuous track from said welding apparatus, said welding apparatus comprising a fixed assembly and a movable assembly each of which includes clamping means for clamping the ends of the continuous rail sections to be welded together, means for longitudinally advancing and retracting said movable assembly with respect to said fixed assembly, first and second electrodes respectively engageable with adjacent ends of said continuous rail sections to be welded together and means for causing current flow between said electrodes and through the ends of said continuous rail sections in order to make the weld, a first one of said continuous rail sections being supplied by said rail transfer device from said rail supply means to and through said welding apparatus until one end thereof is positioned approximate the weld axis of said welding apparatus, said one end of said first one of said continuous rail sections being clamped in said movable assembly of said welding apparatus, the other end thereof extending through said pusher mechanism and lying on the ties of a railroad track, a portion of said first one of said continuous rail sections extending from said welding apparatus and said pusher mechanism forming a loop or length of rail which is of sufficient length and flexibility to permit the end of said first one of said continuous rails positioned approximate the weld axis to be longitudinally advanced and retracted with respect to the end of a second one of said continuous rail sections supplied to said welding apparatus with the end thereof positioned approximate the weld axis, a second one of said continuous rail sections being supplied by said rail transfer device from said rail supply means to said welding apparatus with the end thereof positioned approximate the weld axis of said welding apparatus, said end of said second one of said continuous rail sections being clamped by said clamping means in said fixed assembly of said welding apparatus, said means for longitudinally advancing and retracting said movable assembly being operated to longitudinally advance and retract and then force the end of said first one of said continuous rail sections together with the end of said second one of said continuous rail sections as current is caused to flow between said electrodes and through the ends of said continuous rail sections to form a flash butt welded joint, whereby advantage is taken of said portion of said first one of said continuous rail sections extending from said welding apparatus and said pusher mechanism to permit the ends of said continuous rail sections to be welded together without the necessity of longitudinally advancing and retracting the entire length of either of said continuous rail sections.

12. Welding apparatus for welding workpiece sections together in end-to-end relationship to form a continuous length comprising a main frame, a fixed assembly supported by said main frame, a movable assembly supported by said main frame and longitudinally movable with respect to said fixed assembly, first and second electrodes respectively engageable with adjacent end portions of successive workpiece sections to be welded together and means for causing current flow between the electrodes and through the ends of the workpiece sections in order to make the weld, said fixed and movable assemblies each comprising a pair of clamp assemblies for clamping the ends of said workpiece sections to be welded together, said clamp assemblies each comprising a hydraulic cylinder, a pair of clamp arms pivotally supported in opposed relationship so as to clamp the workpiece section between them and a plurality of lever arms coupled to said hydraulic cylinder and the respective ones of said pair of clamp arms for pivotally operating said clamp arms to clamp the workpiece section between them upon operation of said hydraulic cylinder, a spring assembly associated with each of said clamp arms for transmitting to said clamp arms a vertical press-on force for clamping the workpiece section, said clamp assemblies being pivotally operable to clamp a workpiece section between them and to open to permit the workpiece section and the welding apparatus to be vertically displaced with respect to one another, each of said pair of clamp arms having removably affixed to the end thereof a clamp head formed to substantially correspond to the shape of said workpiece sections to be welded together, whereby said welding apparatus can be utilized to weld together in end-to-end relationship various workpieces such as pipes to form a continuous length pipeline, said electrodes likewise being correspondingly formed to the shape of the workpiece.

* * * * *